United States Patent
Kauffman, II et al.

(10) Patent No.: US 11,925,170 B2
(45) Date of Patent: Mar. 12, 2024

(54) DISPOSABLE CAT LITTER BOX

(71) Applicants: Porter W. Kauffman, II, Greenville, NC (US); Chad R. Kauffman, Wooster, OH (US)

(72) Inventors: Porter W. Kauffman, II, Greenville, NC (US); Chad R. Kauffman, Wooster, OH (US)

( * ) Notice: Subject to any disclaimer, the term of this patent is extended or adjusted under 35 U.S.C. 154(b) by 0 days.

(21) Appl. No.: 18/115,079

(22) Filed: Feb. 28, 2023

(65) Prior Publication Data

US 2023/0210084 A1 Jul. 6, 2023

Related U.S. Application Data

(63) Continuation of application No. 17/148,084, filed on Jan. 13, 2021, now Pat. No. 11,617,344, which is a continuation of application No. 16/576,654, filed on Sep. 19, 2019, now Pat. No. 11,160,248, which is a continuation-in-part of application No. 16/109,116, filed on Aug. 22, 2018, now Pat. No. 10,893,655, said application No. 17/148,084 is a continuation-in-part of application No. 16/109,116, filed on Aug. 22, 2018, now Pat. No. 10,893,655.

(60) Provisional application No. 62/549,039, filed on Aug. 23, 2017.

(51) Int. Cl.
*A01K 1/00* (2006.01)
*A01K 1/01* (2006.01)

(52) U.S. Cl.
CPC .................. *A01K 1/0125* (2013.01)

(58) Field of Classification Search
CPC .................................... A01K 1/0125
USPC ........................................ 119/168
See application file for complete search history.

(56) References Cited

U.S. PATENT DOCUMENTS

| | | |
|---|---|---|
| 4,014,292 A | 3/1977 | Coughlin et al. |
| 4,624,380 A | 11/1986 | Wernette |
| 4,763,603 A | 8/1988 | Coes |
| 4,782,788 A | 11/1988 | Arcand |
| 4,807,563 A | 2/1989 | Berry et al. |
| 4,813,376 A | 3/1989 | Kaufman et al. |
| 4,846,103 A | 7/1989 | Brown |
| 4,846,105 A | 7/1989 | Caldwell |
| 4,940,016 A | 7/1990 | Heath |
| 4,967,692 A | 11/1990 | Mills |
| 4,976,218 A | 12/1990 | Cirami |
| 4,981,104 A | 1/1991 | Goodwin |

(Continued)

FOREIGN PATENT DOCUMENTS

AR  004186 A4  11/1998

OTHER PUBLICATIONS

SHELL plc, "What is LLDPE Plastic?", retrieved from the internet: URL: https://www.shell.us/business-customers/shell-polymers/resources-and-insights/lldpe-plastic.html [retrieved on Jun. 16, 2022]; pp. 1-6.

(Continued)

*Primary Examiner* — Richard T Price, Jr.

(74) *Attorney, Agent, or Firm* — COATS & BENNETT, PLLC

(57) ABSTRACT

A cat litter box is designed to be folded into a compact form for storage and shipment to a customer and unfolded by the customer for use. When it is time to replace the litter box, the cat litter box can be refolded back into a compact form for disposal. A lid protects the box during storage and shipment.

14 Claims, 14 Drawing Sheets

(56) References Cited

U.S. PATENT DOCUMENTS

| | | | |
|---|---|---|---|
| 5,014,649 A | 5/1991 | Taft | |
| 5,035,205 A | 7/1991 | Schiller et al. | |
| 5,078,099 A | 1/1992 | Balson | |
| 5,178,100 A | 1/1993 | Monk | |
| 5,203,282 A | 4/1993 | Hasiuk | |
| 5,465,686 A | 11/1995 | Monetti et al. | |
| 5,564,365 A | 10/1996 | Kacic | |
| 5,566,641 A | 10/1996 | Radli et al. | |
| 5,572,951 A | 11/1996 | Evans et al. | |
| 5,655,479 A * | 8/1997 | Armington | G01N 33/84 |
| | | | 119/168 |
| 5,685,259 A | 11/1997 | Santioemmo et al. | |
| 5,727,499 A | 3/1998 | Armington et al. | |
| 5,730,085 A | 3/1998 | Santoiemmo | |
| 5,752,466 A | 5/1998 | Lundeen et al. | |
| 5,832,869 A | 11/1998 | Franczak et al. | |
| 5,845,601 A | 12/1998 | Robinson | |
| 9,258,977 B1 | 2/2016 | Hilger et al. | |
| 9,439,490 B2 | 9/2016 | DeGeorge | |
| 10,893,655 B2 | 1/2021 | Kauffman, II et al. | |
| 2004/0244709 A1 | 12/2004 | Schulein, Jr. | |
| 2008/0003171 A1 | 1/2008 | Smith et al. | |
| 2009/0148342 A1 | 6/2009 | Bromberg et al. | |
| 2011/0180008 A1 | 7/2011 | Davis | |
| 2012/0234252 A1 | 9/2012 | Donta et al. | |
| 2013/0019810 A1 | 1/2013 | Romano | |
| 2018/0055002 A1* | 3/2018 | Carroll | A01K 1/0107 |

OTHER PUBLICATIONS

Howard, H., "Waterproofing Cardboard", PackOn, Retrieved from the internet: URL: http://packcon.org/index.php/en/articles/113-2017new/201-waterproofing-cardboard [Retrieved on Jun. 16, 2022]; Jun. 9, 2017; pp. 1-6.

* cited by examiner

DISPOSABLE CAT LITTER BOX

RELATED APPLICATIONS

This application is a continuation application of application Ser. No. 17/148,084 filed Jan. 13, 2021, which is a continuation application of application Ser. No. 16/576,654 filed Sep. 19, 2019, now U.S. Pat. No. 11,160,248, which is a continuation-in-part of application Ser. No. 16/109,116 filed Aug. 22, 2018, now U.S. Pat. No. 10,893,655, which claims the benefit of U.S. Provisional Application No. 62/549,039 filed Aug. 23, 2017. Application Ser. No. 17/148,084 is also a continuation-in-part of application Ser. No. 16/109,116 filed Aug. 22, 2018, now U.S. Pat. No. 10,893,655, which claims the benefit of U.S. Provisional Application No. 62/549,039 filed Aug. 23, 2017. Each of these prior applications is incorporated herein by reference in its entirety.

TECHNICAL FIELD

The present invention relates generally to cat litter boxes and, more particularly, to a disposable cat litter box with a corrugated cardboard construction.

BACKGROUND

Cat litter was developed for the purpose of allowing humans to share a living space with their cat. The invention of cat litter created a cohabitated space for humans and cats but also created two significant challenges most cat owners experience: finding ways to eliminate odor from the litter box, and managing the waste created by cats. Regular replenishment of fresh litter is required for hygiene purposes, and cat owners must properly dispose of soiled litter. Both activities are time consuming and unfavorable experiences for most cat owners. Typical cat litter available in today's retail establishments are heavy, awkward to handle and inconvenient for transporting home.

SUMMARY

A disposable cat litter box is designed to be folded into a compact form for storage and/or shipment to a customer. The cat litter box is prepacked with a predetermined amount of cat litter. The box is unfolded by the customer for use. When it is time to replace the cat litter box, it is refolded back into a compact form for disposal.

The cat litter box comprises a box and a cat litter tray. The box includes a bottom and side walls extending upwardly from the bottom to form a litter compartment. The cat litter tray is shaped to conform to the interior space of the litter compartment and includes an outer periphery that is sealed to the inner surfaces of the side walls. Extension panels hingedly connect to respective side walls and are configured to move between a folded position in which the litter compartment is enclosed by the extension panels and an unfolded position in which the extension panels extend upward from the side walls to form an extended litter compartment. An opening or cut-out in one of the extension panels provides means for ingress into and egress out of the assembled cat litter box by a cat. In some embodiments, the box may include a lid to protect the box during storage and shipment.

In one exemplary embodiment, the box is manufactured from single wall "B flute" material. The interior and exterior surfaces of the box are protected from cat urine and moisture damage by applying a water-resistant coating that is not easily penetrated by water, i.e. water repellant, or is impervious to water, i.e. water-proof. A heat-activated adhesive coating is applied over the water-resistant coating on the interior of the side walls for adhering the cat litter tray to the interior of the box. The cat litter tray and box are then placed on a mold while heat and pressure are simultaneously applied to the outer surfaces of the box. The pressure ensures that good contact is made between the cat litter tray and the side walls of the box while heat is simultaneously transferred through the box material to activate the adhesive.

DETAILED DESCRIPTION

Figure 1:
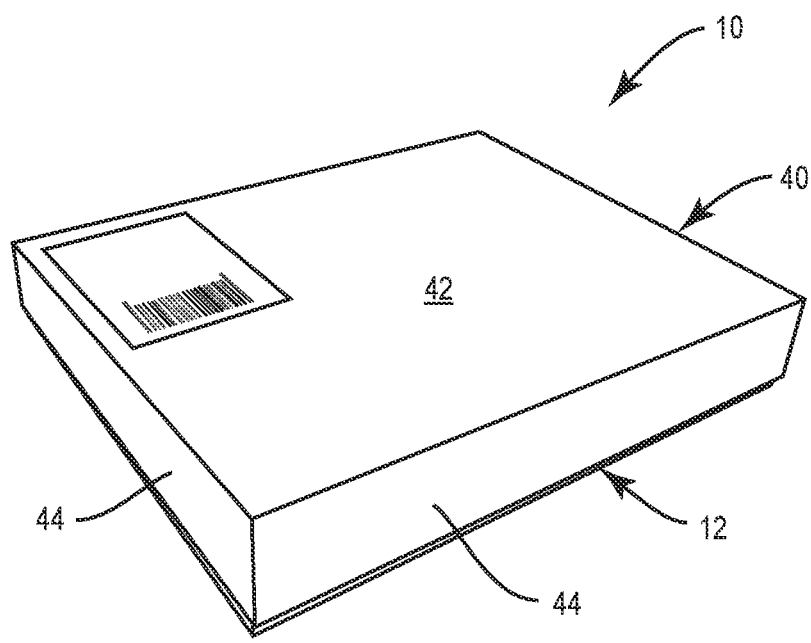
FIG. 1 is a perspective view of the cat litter box in a folded configuration with the lid in place.

Referring now to the FIGS. 1-5, a disposable cat litter box according to one embodiment is shown and indicated generally by the numeral 10. The main components of the cat litter box 10 comprise a box 12, a lid 40 for the box 12, and a cat litter tray 50 disposed inside the box 12. The cat litter box 10 is designed to be folded into a compact form for storage and shipment to a customer and unfolded by the customer for use. When it is time to replace the cat litter box 10, the cat litter box 10 can be folded back into a compact form for disposal. The lid 40 protects the box 12 during storage and shipment.

Figure 2:
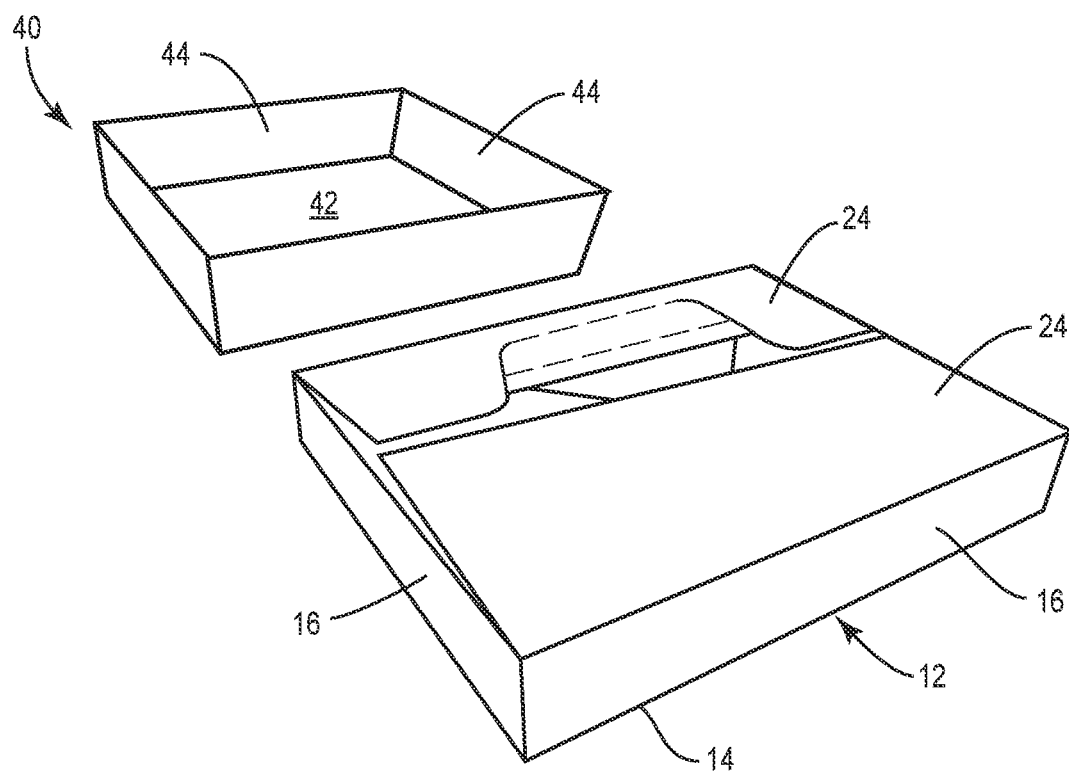
FIG. 2 is a perspective view of the cat litter box in a folded configuration with the lid removed.
Figure 5:
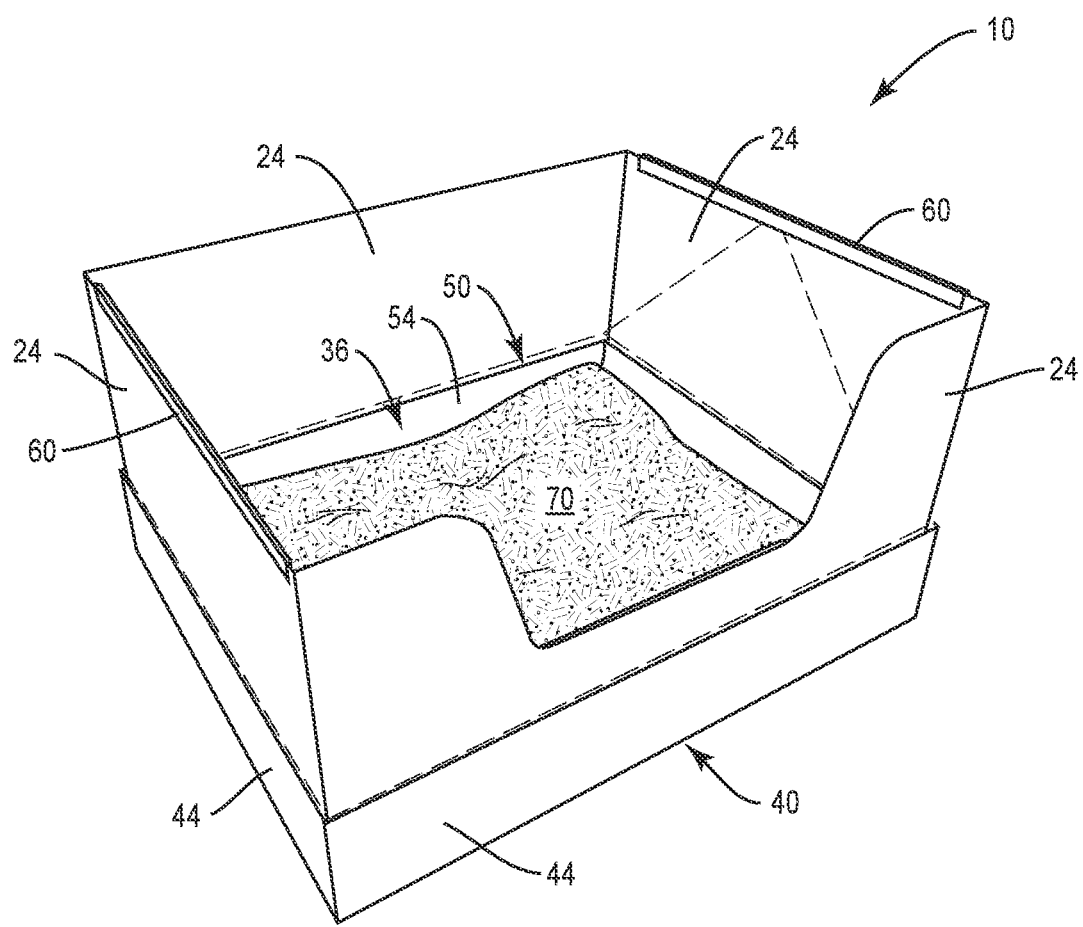
FIG. 5 is a perspective view of the cat litter box fully assembled for use with the extension panels unfolded and locked.
Figure 6:
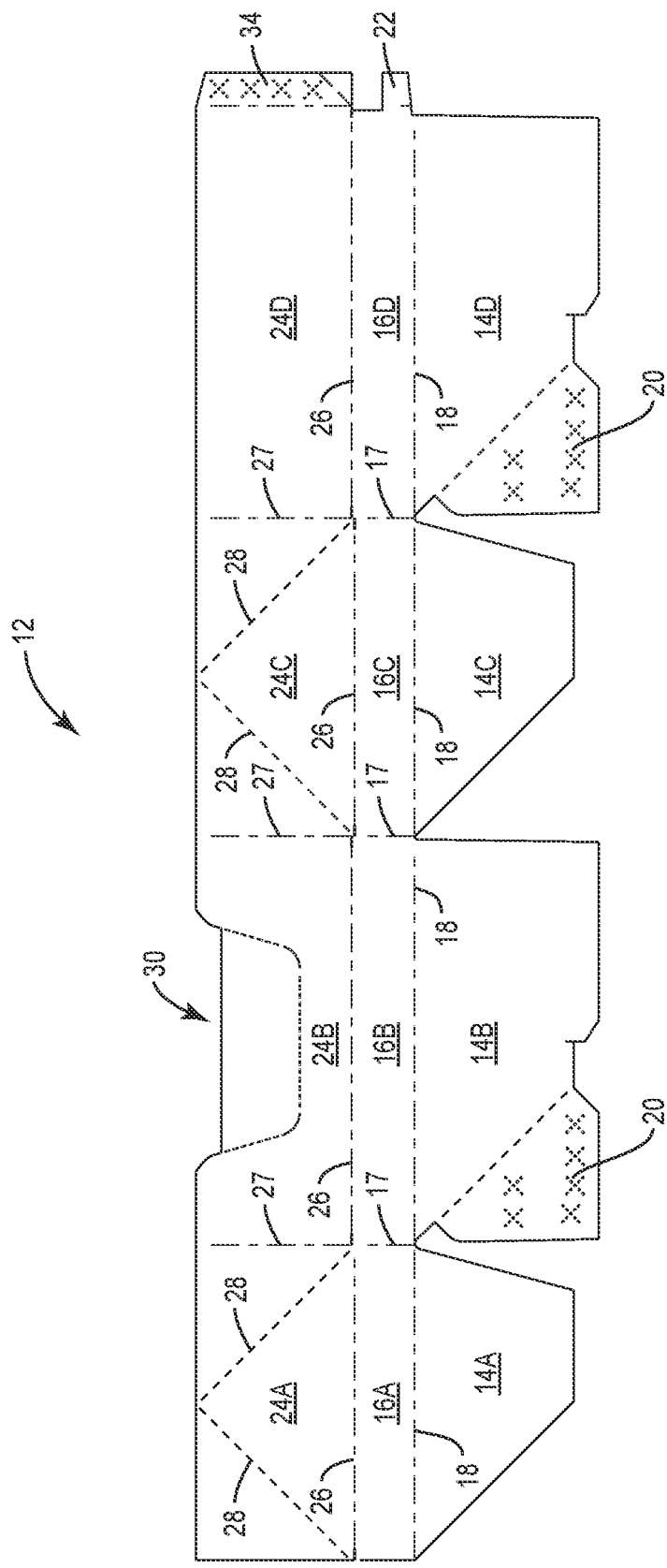
FIG. 6 is a plan view of a cardboard blank from which a box for use in the cat litter box is constructed.

In one embodiment, the box 12 is generally rectangular in form and preferably constructed of cardboard, though other materials could be used in some embodiments. The box 12 comprises a bottom indicated generally by the numeral 16, side walls indicated generally by the numeral 14, and extension panels indicated generally by the numeral 24. The bottom 14 is formed by four bottom panels indicated individually by the reference numerals 14A-14D as seen in FIG. 6. An adhesive 20 is applied to a portion of bottom panels 14B and 14D that overlap with bottom panels 14A and 14C respectively when the box 12 is assembled. The side walls 16, indicated individually by reference numerals 16A-16D, join respective bottom panels 14A-14D along horizontal fold lines 18. The side walls 16A-16D also join along corner fold lines 17. Side wall 16D includes a tab 22 that overlaps with and attaches to side wall 16A when the box 12 is assembled to join side walls 16A and 16D at the corner of the box 12. The bottom 14 and sidewalls 16 together define a litter compartment 36 inside the box 12 when the box 12 is assembled. Extension panels 24, indicated individually by reference numerals 24A-24D, join respective side walls 16A-16D along horizontal fold lines 26. Extension panels 24A-24D join along corner fold lines 27. Extension panel 24D includes a tab 34 that overlaps with and attaches to extension panel 24A when the box 12 is assembled to join extension panels 24A and 24D at the corner of the box 12. The extension panels 24 are moveable between a folded position as shown in FIG. 2 and an unfolded position as shown in FIG. 5. Extension panels 24A and 24C include diagonal fold lines 28 that enable the extension panels 24A and 24C to fold inwardly while joined at the corners with extension panels 24B and 24D. Extension panel 24B includes a perforated cut-out 30 that when removed provides an opening for a cat to enter into and exit from the litter compartment 36 when the cut-out is removed by the user.

The lid 40 of the cat litter box 10 is also rectangular in form and conforms to the shape of the box 12. The lid 40 includes a top 42 and side walls 44 that extend down from the top 42. The top 40 and side walls 44 are sized to fit over the side walls 16 of the box 12 when the extension panels 24 are in the folded position as shown in FIG. 2. FIG. 1 illustrates the lid 40 fitted over the box 12.

Figure 7:
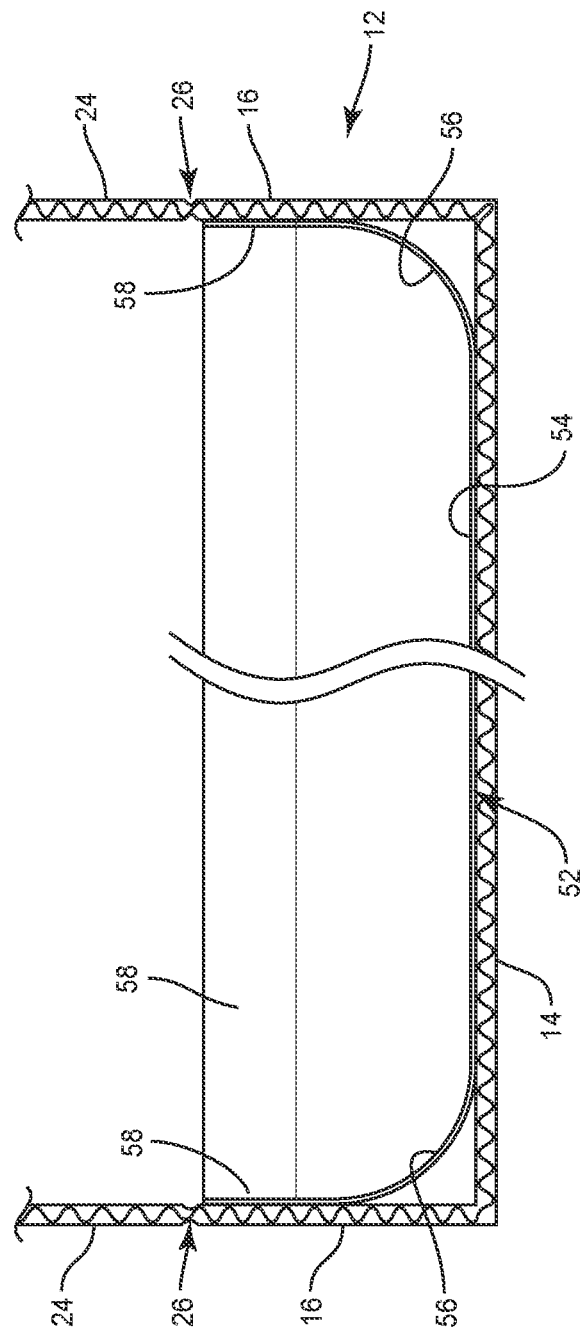
FIG. 7 is a partial section view illustrating an exemplary method for adhering the cat litter tray to the interior of a box used in to make the cat litter box.

The cat litter tray 50 is disposed inside the litter compartment 36 defined by the bottom 14 and side walls 16 of the box 12. In one embodiment, the cat litter tray 50 is made of a polymer and molded to conform in size and shape to the interior of the litter compartment 36. The cat litter tray 50 comprises a tray 52 having flanges 58 that extend from the outer periphery of the tray 52. The tray 52 include a bottom 54 and curved side walls 54 to hold cat litter. Flanges 56 extend from the outer periphery of the tray 52 for securing the cat litter tray 50 inside the litter compartment 36 and providing protection from cat urine to the portion of the side walls 24 immediately above top of the tray 52. When the cat litter tray 50 is disposed in the litter compartment 36, the flanges 56 extend upwardly from the outer periphery of the tray portion 52. The flanges 56 lie flat against the inner surfaces of the side walls 24 of the box 12 and are sealed to the side walls 24 by an adhesive as shown in FIG. 7. For example, the flanges 56 of the cat litter tray 50 can be sealed to the inner surfaces of the side walls 24 by a double-sided adhesive tape, or by an adhesive coating applied to the inner surfaces of the side walls 24.

The reinforcing strips 60 provide structural support for and protect the top edges of the extension panels 24A and 24C when the cat litter box 10 is assembled for use. Similar protective strips (not shown) could also be applied to the top edges of the side walls 24B and 24D for protection of the top edges. The reinforcing strips 60 in one embodiment comprise extruded polymer strips with an inverted u-shaped cross section configured to slide onto the top edges of the extension panels 24.

In one embodiment, the box 12 and lid 40 are manufactured from single wall "B flute" material. The height of the extension panels 24 helps keep the litter contained within the litter compartment during use. An entrance opening into the cat litter box 10 for the cat measures, in one embodiment 11" W×5½" H so that a cat can easily enter into and exit from the litter compartment when the cat litter box 10 is in use. The lid 40 can be placed on the bottom 14 of the box 12 during use as shown in FIG. 5, or alternatively be placed over the extension panels 24 to cover the extended litter compartment during use.

The interior surfaces of the box 12 can be protected from cat urine and moisture damage by applying a water-resistant coating, durable water-resistant coating. In some embodiments, the interior and exterior surfaces of the lid 40 are also be protected in a similar manner. The interior coating provides a moisture barrier that protects the interior of the box 12 from cat urine. An exterior coating can also be applied to the outer surfaces of the box 12 if desired to protect the box 12 from moisture damage during home delivery. In one embodiment, the box 12 measures 19" L×14⅜" W×3" H (disassembled) and 19" L×14" W×10¼" H (assembled).

Figure 8:
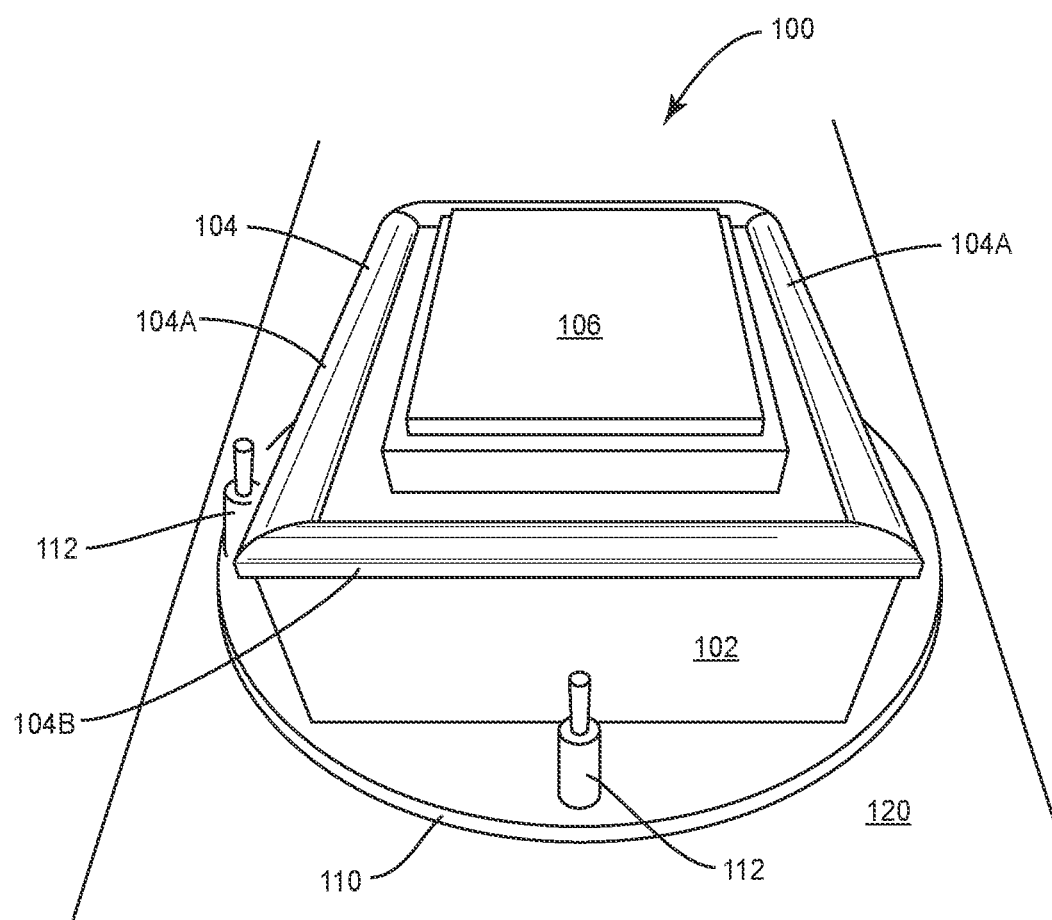
FIG. 8 is a perspective view of a mold used in the manufacture of the cat litter box.
Figure 9:
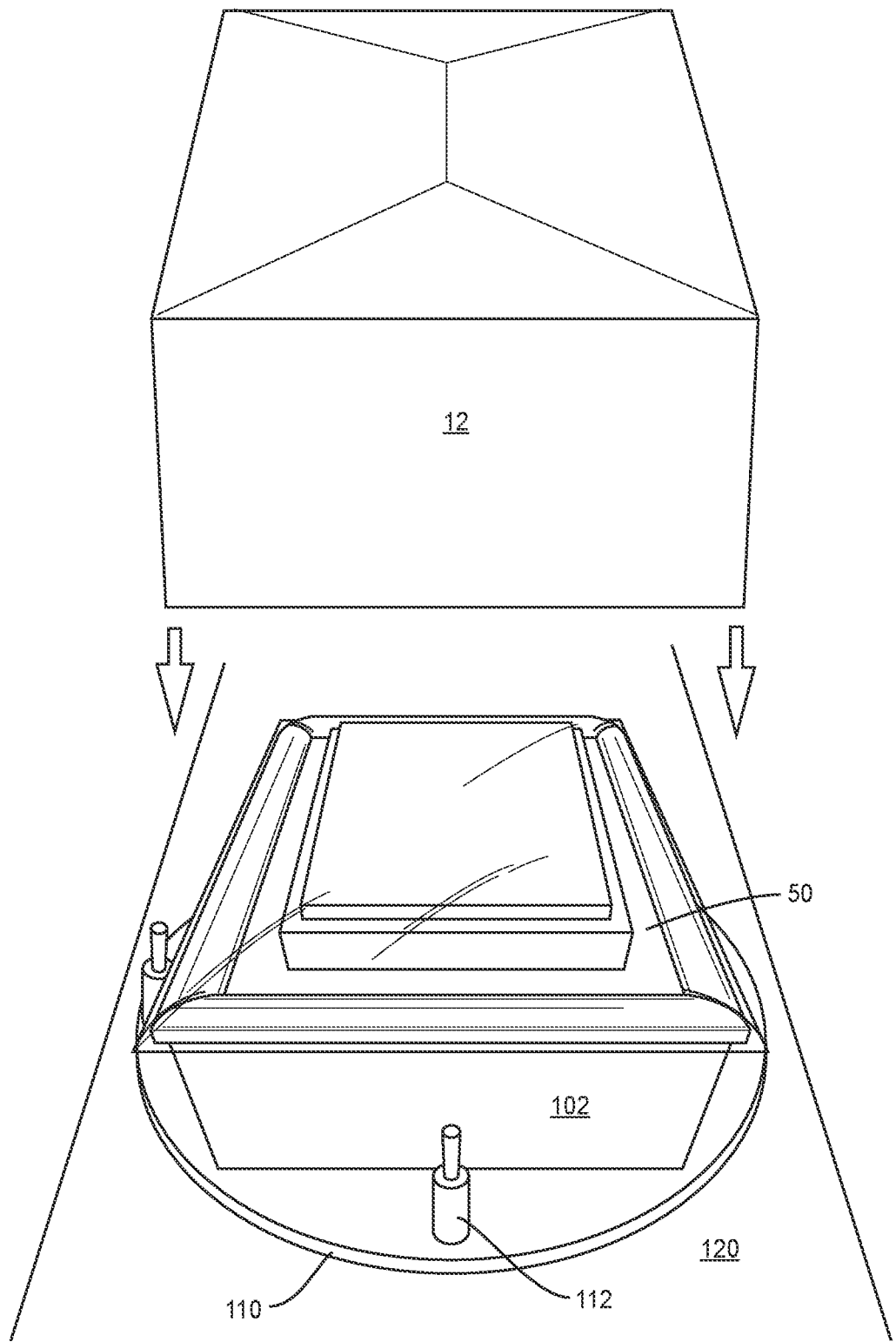
FIG. 9 is a perspective view of the cat litter box being placed on the mold.
Figure 10:
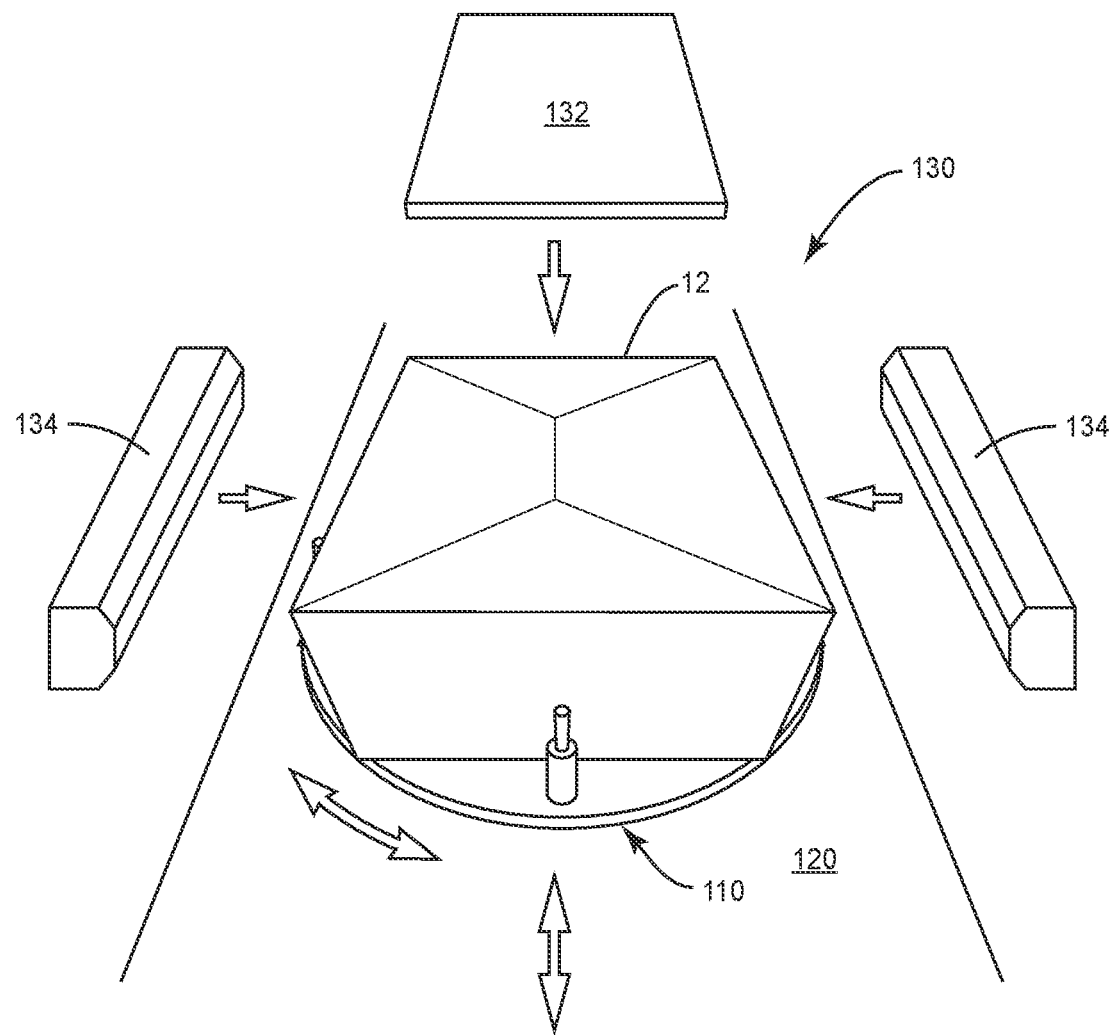
FIG. 10 is a perspective view illustrating a method adhering the cat litter tray to the interior of the cat litter box by simultaneous application of heat and pressure to the exterior of the box.

FIGS. 8-10 illustrate an exemplary method of manufacturing the cat litter box 10. Generally, the box 12 is assembled from the blank shown in FIG. 6 after a water-resistant coating is applied interior and exterior surfaces of the box 12. A second coating of a heat-activated adhesive is applied over the water-resistant coating to the inner surfaces of the side walls 24 where the side walls 24 are contacted by the flanges 56 of the cat litter tray 50. The cat litter tray 50 and box 12 are then placed on a mold while heat and pressure are simultaneously applied to the outer surfaces of the box 12. The pressure ensures that good contact is made between the flanges 56 of the cat litter tray 50 and the side walls 24 of the cat litter box 10 while heat is simultaneously transferred through the box material to activate the adhesive.

FIG. 8 illustrates an exemplary mold 100 used in the manufacture of the cat litter box 10. The mold 100 comprises a base 102 and a curved frame 104 that conforms to the interior shape of the cat litter tray 50. The frame 104 includes curved portions 104A configured to contact the inner surfaces of the side walls 54 of the cat litter tray 50 and flat, outwardly facing surfaces 104B configured to contact the interior side of the flanges 56 of the cat litter tray 50. A raised surface 106 extends upward from the center of the base 102 to contact the inner surface of the bottom 52 of the cat litter tray 50. In one embodiment, the raised surface 106 comprises a cork material.

The mold 100 is mounted on a carrousel 110 that rotates 90%. The carrousel 110 includes two handles 112 for rotating the carrousel 110 as hereinafter described. The carrousel 110 in turn is mounted on a shuttle 120 that moves forward and backward into and out of a heating machine 130, shown schematically in FIG. 10.

During manufacture, the cat litter tray 50 is placed in an inverted position on the mold 110 and the box 12 is pressed down over the cat litter tray 50 as shown in FIG. 9. After the cat litter tray 50 and box 12 are placed on the mold 100, the carrousel 110 is pushed forward into the heating machine 130. The heating machine 130 comprises a pressure plate 132 that presses down in the bottom 14 of the box 12 to ensure that the cat litter tray 50 and box 12 are properly positioned on the mold 100. Heating bars 134 then move inwardly to simultaneously contact two opposing side walls 24 of the box 12. The heating bars 134 apply pressure in the range of about 80 to 125 lbs/in². The applied pressure ensures that good contact is made between the flanges 56 of the cat litter tray 50 and the side walls 24 of the cat litter box 10, while heat in the range of about 100 degrees to 400 degrees Fahrenheit is simultaneously applied to the outer surface of the box 12. The heat transferred through the box material activates the adhesive coating on the side walls 24 to adhere the flanges 56 of the cat litter tray 50 to the side walls 24. The amount of the applied pressure and heat will vary depending on the characteristics of the box material and the type of the adhesive coating. The pressure and heat are applied until the adhesive coating is activated, which can occur in under 10 seconds depending on the materials. After the cat litter tray 50 is adhered to the first two sides of the cat litter box 10, the carrousel 110 is retracted from the heating machine 130, rotated 90%, and then pushed back into the heating machine 130 to adhere the cat litter tray 50 to the remaining two side walls 24 as described above.

In use, the cat litter box 10 pre-packaged with cat litter 70 is purchased by or shipped to a user in a folded configuration as shown in FIG. 1. The reinforcing strips 60 strips along with a bag of cat litter 70 are enclosed inside the box 12. In one embodiment, the cat litter 70 comprises a silica gel bead that varies in size from about 3 mm to about 8 mm in diameter. The cat litter 70 is packaged inside a sealed bag with an easy to open tear strip for the customer's use. The sealed bag keeps any moisture from coming in contact with the cat litter 70 prior to its use as a litter.

Figure 3:
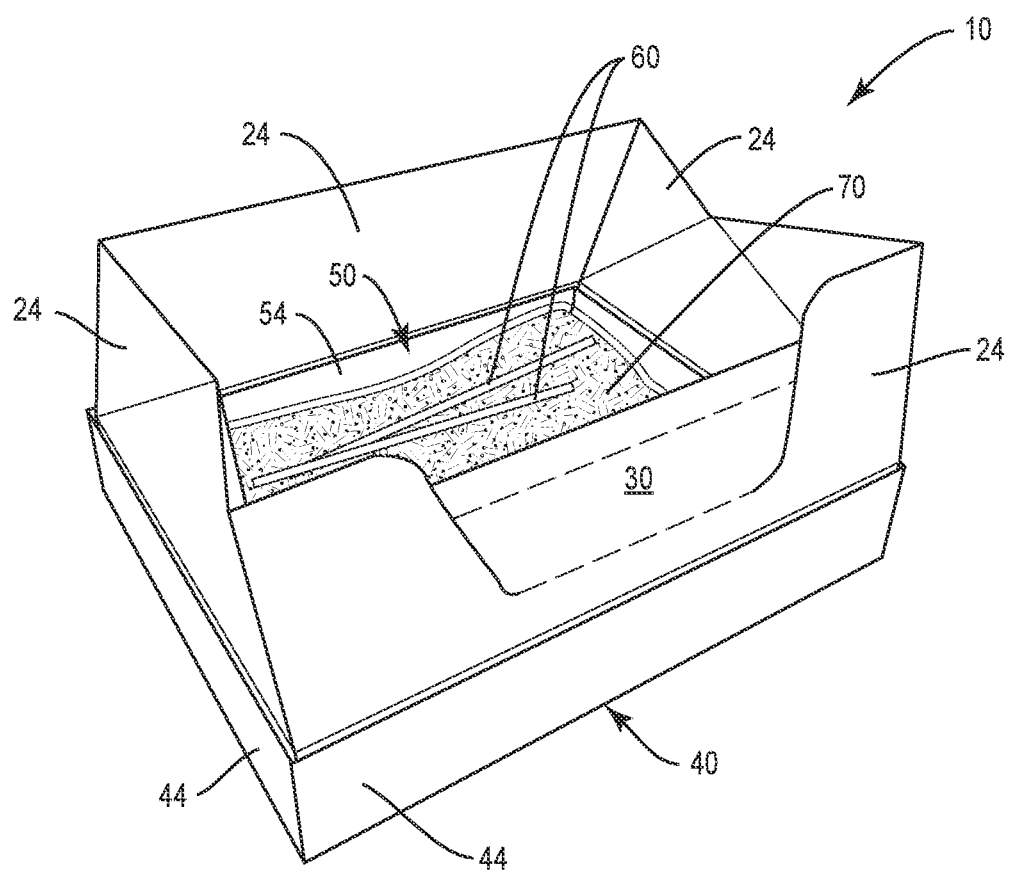
FIG. 3 is a perspective view of the cat litter box with the lid placed on the bottom and the extension panels partially unfolded.
Figure 4:
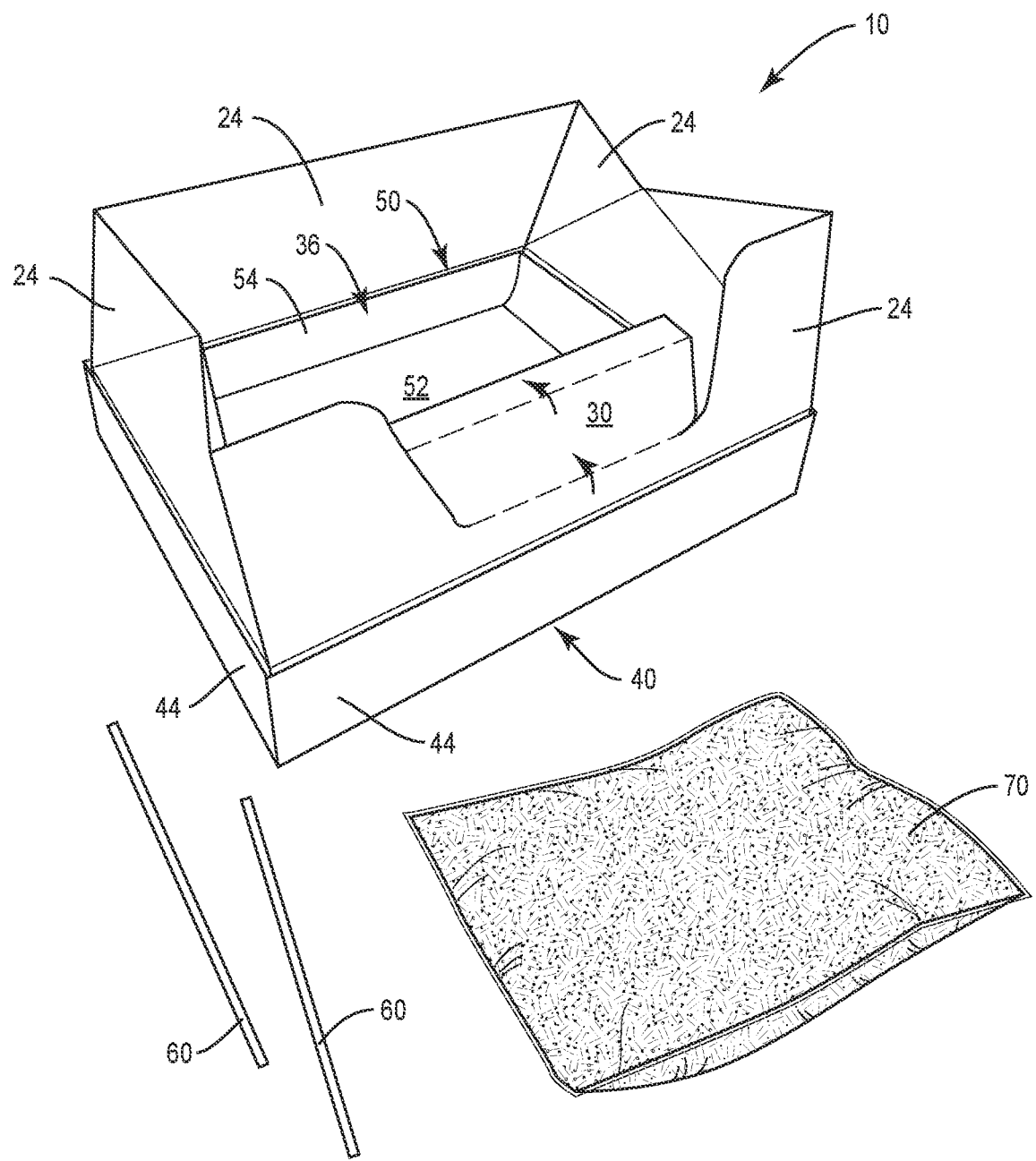
FIG. 4 is a perspective view of the cat litter box with the lid placed on the bottom and the contents removed.

To put the cat litter box 10 into use, the customer removes the lid 40 from the folded box 12, folds the extension panels 24 upward and outward to the unfolded position as shown in FIGS. 3 and 4, and places the reinforcing strips 60 provided on the top edges of the side panels 24A and 24C to lock the cat litter box 10 into the final operational position as shown in FIG. 5. The perforated cut-out 30 can either be removed and discarded or folded down inside the cat litter box 10 to provide an opening for the cat to enter into and exit from the cat litter box 10. The lid 40 may be stored by placing it under the cat litter box 10 as shown, or may be placed on top for use as a cover.

After approximately 30 days of use, the cat litter box 10 is ready to be properly disposed of. The reinforcing strips 60 are removed and placed inside the cat litter tray 50 or otherwise disposed of. The litter box is the folded back into the original folded position and the lid 40 is placed back on the top of the cat litter box 10 as shown in FIG. 1 for disposal.

Referring now to the FIGS. 11-15, a disposable cat litter box according to one embodiment is shown and indicated generally by the numeral 100. The main components of the cat litter box 100 comprise a foldable box 120 and a lid 400. The cat litter box 100 is designed to be folded into a compact form for storage and shipment to a customer and unfolded by the customer for use. When it is time to replace the cat litter box 100, the cat litter box 100 can be folded back into a compact form for disposal. The lid 400 protects the box 120 during storage, shipment and disposal.

Figure 16:
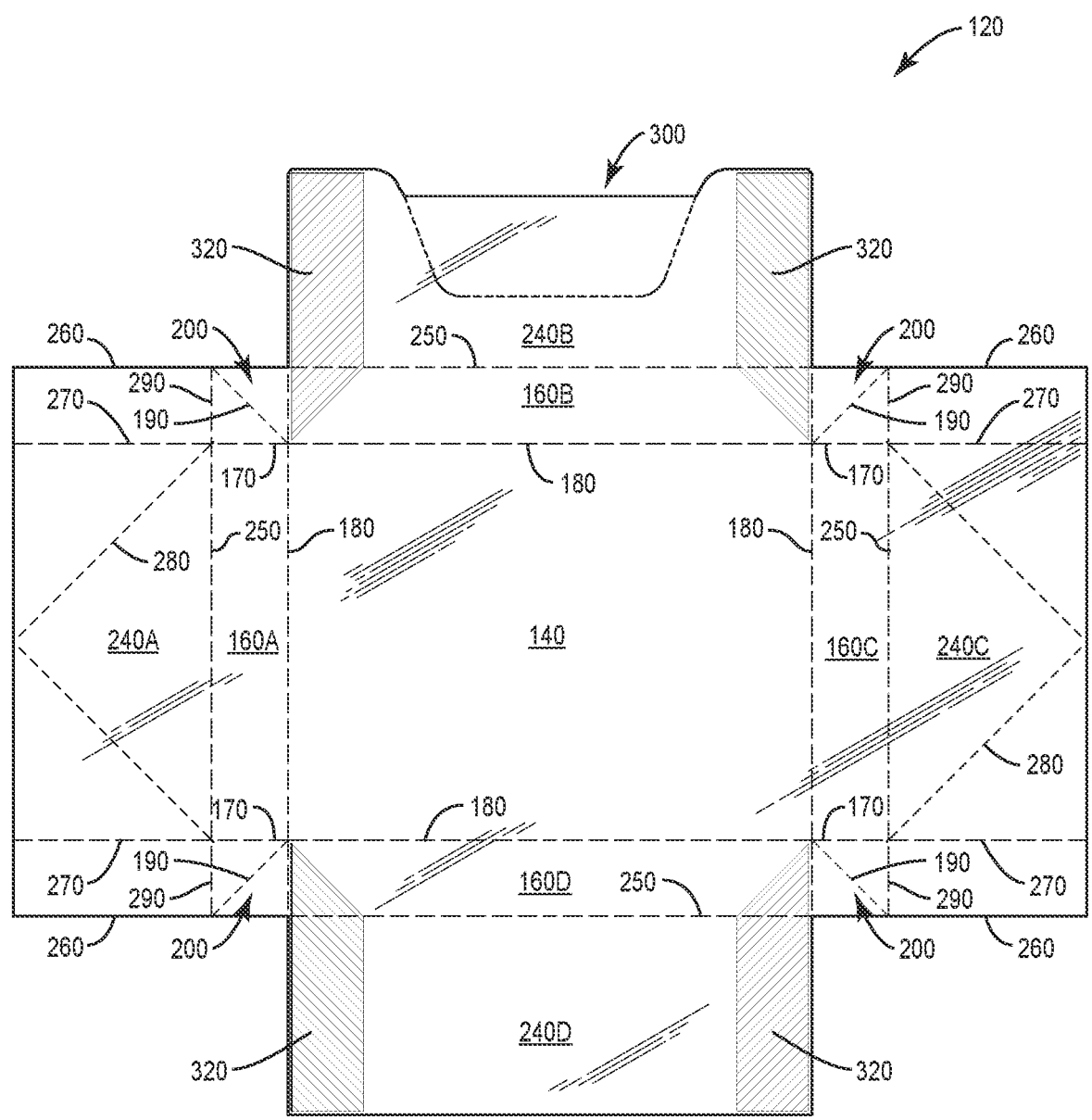
FIG. 16 is a plan view of a cardboard blank from which a box for use in the cat litter box is constructed.

In one embodiment, the foldable box 120 is generally rectangular in form and preferably constructed of corrugated cardboard or paperboard, though other materials could be used in some embodiments. In one embodiment, the box 120 measures approximately 19" L×14⅜" W×3" H (disassembled) and approximately 19" L×14" W×10¼" H (assembled), although the dimensions may differ in other embodiments. The box 120 comprises a bottom indicated generally by the numeral 140, side walls indicated generally by the numeral 160, and extension panels indicated generally by the numeral 240. The bottom 140 is formed by a single panel as seen in FIG. 16. The side walls 160, indicated individually by reference numerals 160A-160D, join at respective edges of the bottom 140 along horizontal fold lines 180. The side walls 160A-160D also join along corner fold lines 170 to respective corner panels 200, which include diagonal fold lines 190 so that the corner panels 200 fold inwardly when the box 120 is assembled. The bottom 140 and sidewalls 160 together define a litter compartment 360 inside the box 120 when the box 120 is assembled.

Extension panels 240, indicated individually by reference numerals 240A-240D, join respective side walls 160A-160D along horizontal fold lines 250. Extension panels 240A and 240C include side flaps 260 that connect along fold lines 270. The side flaps 260 overlap with and attach to extension panels 240B and 240D when the box 120 is assembled. The side flaps 260 also connect to the corner panels 200 along fold lines 290.

Glue 320 is applied to a portion of the extension panels 240B and 240D and side walls 160B and 160D. The triangular glue area on the side walls 160B and 160D secures the folded corner panels 200 when the box 120 is assembled. Similarly, the rectangular glue area on the extension panels 240B and 240D secures the side flaps 260 when the box 120 is assembled such that the extension panels are joined at the corners of the box 120.

Figure 12:
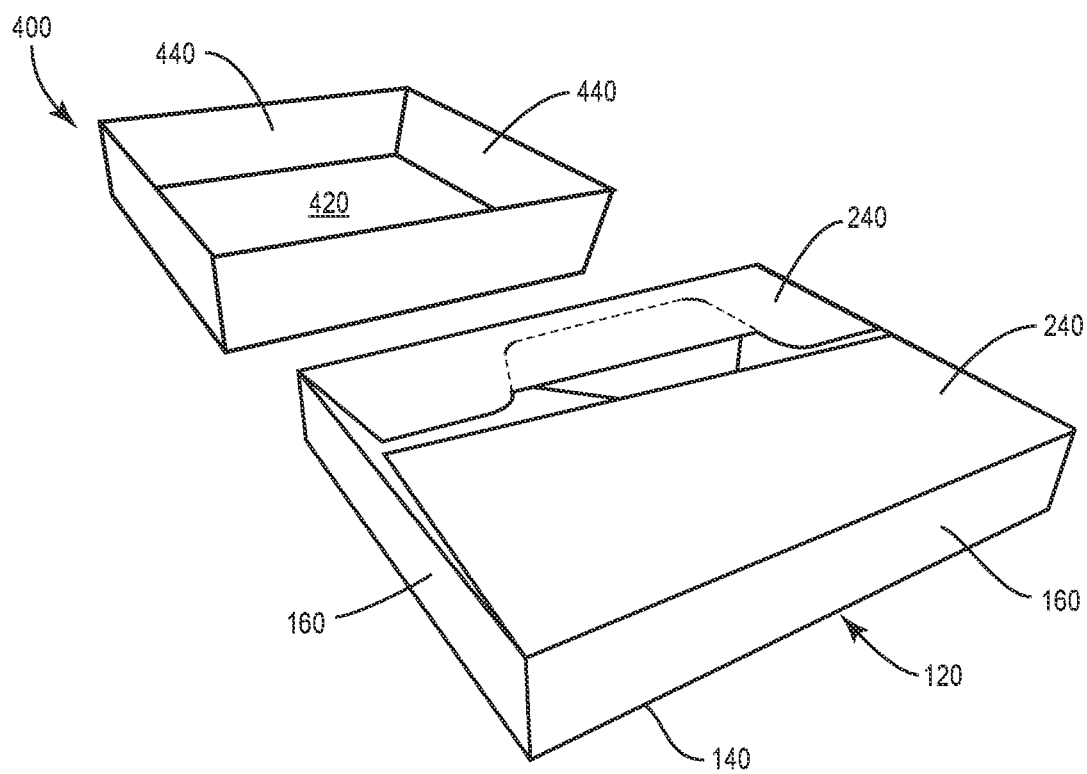
FIG. 12 is a perspective view of the cat litter box in a folded configuration with the lid removed.
Figure 15:
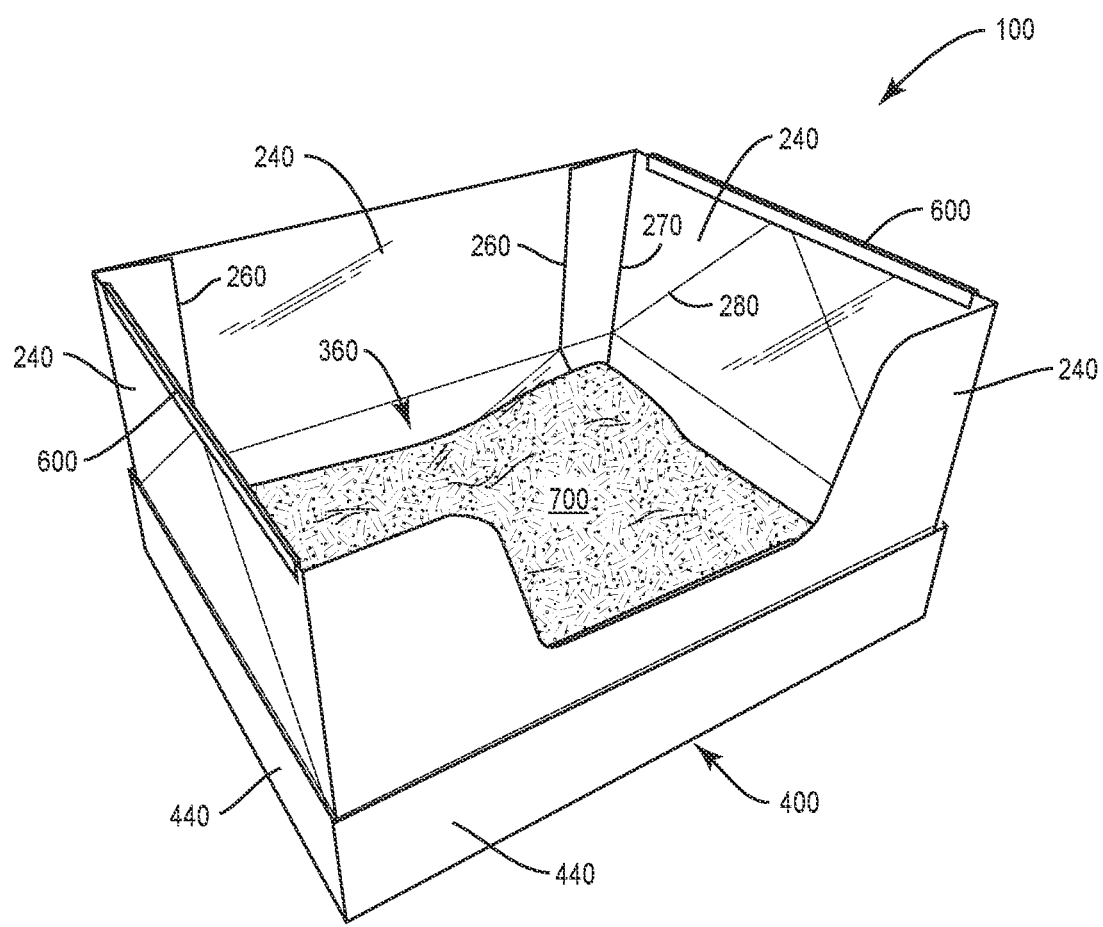
FIG. 15 is a perspective view of the cat litter box fully assembled for use with the extension panels unfolded and locked.

The extension panels 240 are moveable between a folded position as shown in FIG. 12 and an unfolded position as shown in FIG. 15. The diagonal fold lines 280 of extension panels 240A and 240C enable the extension panels 240A and 240C to fold inwardly while joined at the corners with extension panels 240B and 240D. Extension panel 240B includes a perforated cut-out 300 that when removed provides an opening for a cat to enter into and exit from the litter compartment 360 when the cut-out is removed by the user.

Figure 11:
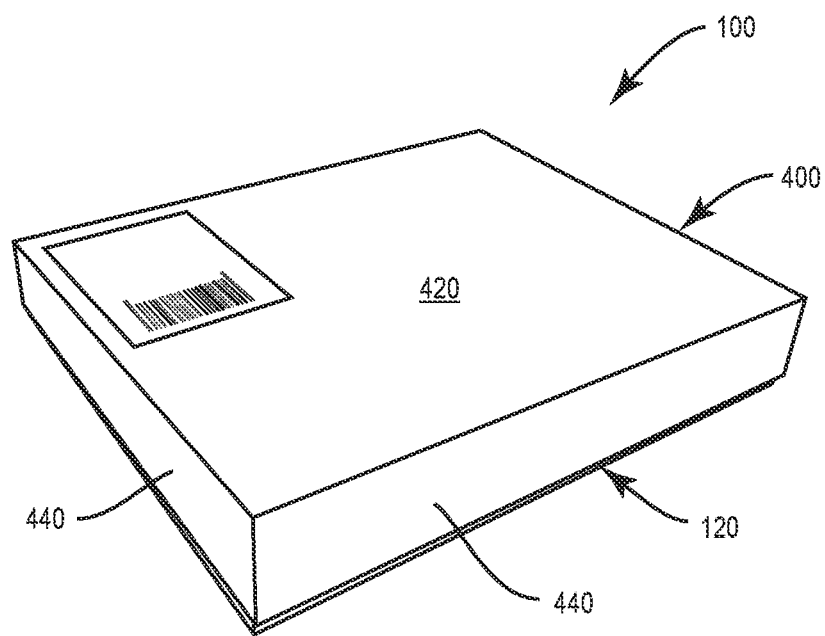
FIG. 11 is a perspective view of the cat litter box in a folded configuration with the lid in place.

The lid 400 of the cat litter box 100 is also rectangular in form and conforms to the shape of the box 120. The lid 400 includes a top 420 and side walls 440 that extend down from the top 420. The top 400 and side walls 440 are sized to fit over the side walls 160 of the box 120 when the extension panels 240 are in the folded position as shown in FIG. 12. FIG. 11 illustrates the lid 400 fitted over the box 120.

The reinforcing strips 600 provide structural support for and protect the top edges of the extension panels 240A and 240C when the cat litter box 100 is assembled for use. Similar protective strips (not shown) could also be applied to the top edges of the side walls 240B and 240D for protection of the top edges. The reinforcing strips 600 in one embodiment comprise extruded polymer strips with an inverted u-shaped cross section configured to slide onto the top edges of the extension panels 240.

In one embodiment, the box 120 and lid 400 are manufactured from single wall "B flute" material. The height of the extension panels 240 helps keep the litter contained within the litter compartment during use. An entrance opening into the cat litter box 100 for the cat measures, in one embodiment 11" W×5½" H so that a cat can easily enter into and exit from the litter compartment when the cat litter box 100 is in use. The lid 400 can be placed on the bottom 140 of the box 120 during use as shown in FIG. 15, or alternatively be placed over the extension panels 240 to cover the extended litter compartment during use.

The interior surfaces of the box 120 can be protected from cat urine and moisture damage by applying a linear low-density, polyethylene (LLDPE) coating 520 to the inside surfaces of the corrugated cardboard 500. In some embodiments, the interior and exterior surfaces of the lid 400 are also be protected in a similar manner. The interior coating provides a moisture barrier that protects the interior of the box 120 from cat urine. An exterior coating can also be applied to the outer surfaces of the box 120 if desired to protect the box 120 from moisture damage during home delivery.

Figure 17:
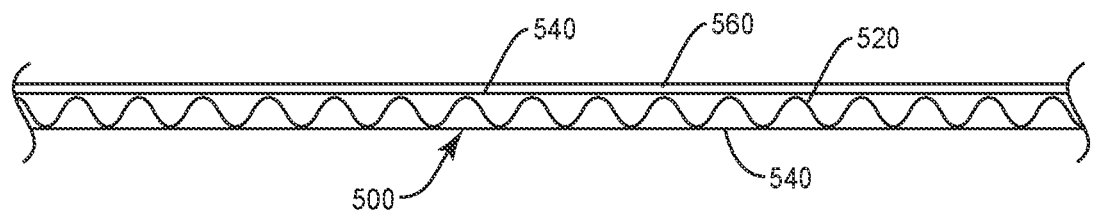
FIG. 17 is a section view showing through a portion of the box 12 showing the coating on the interior surface.

A cross-section of the corrugated cardboard 500 is shown in FIG. 17. The corrugated cardboard comprises corrugated fluting 520 sandwiched between two plies or layers of plain paperboard 540. To make the corrugated cardboard 500, the LLDPE coating can be applied to one layer of the paperboard 540 that is used in the manufacture of the corrugated cardboard 500 prior to adhering the paperboard 540 to the fluting 520. The corrugated cardboard 500 is then made adhering a ply of plain paperboard 540 with the LLDPE coating 560 and a ply of plain paperboard 540 without coating on opposing sides of the fluting 520. The ply of paperboard 540 with the LLDPE coating 560 forms the interior of the box 120 and the ply of paperboard 540 without the LLDPE coating 560 forms the exterior surfaces of the box 120. In another embodiment, the paperboard 540 on both sides of the corrugated cardboard 500 can have an LLDPE coating 520 applied.

In use, the cat litter box 100 pre-packaged with cat litter 700 is purchased by or shipped to a user in a folded configuration as shown in FIG. 11. The reinforcing strips 600 strips along with a bag of cat litter 700 are enclosed inside the box 120. In one embodiment, the cat litter 700 comprises a silica gel bead that varies in size from about 3 mm to about 8 mm in diameter. The cat litter 700 is packaged inside a sealed bag with an easy to open tear strip for the customer's use. The sealed bag keeps any moisture from coming in contact with the cat litter 700 prior to its use as a litter.

Figure 13:
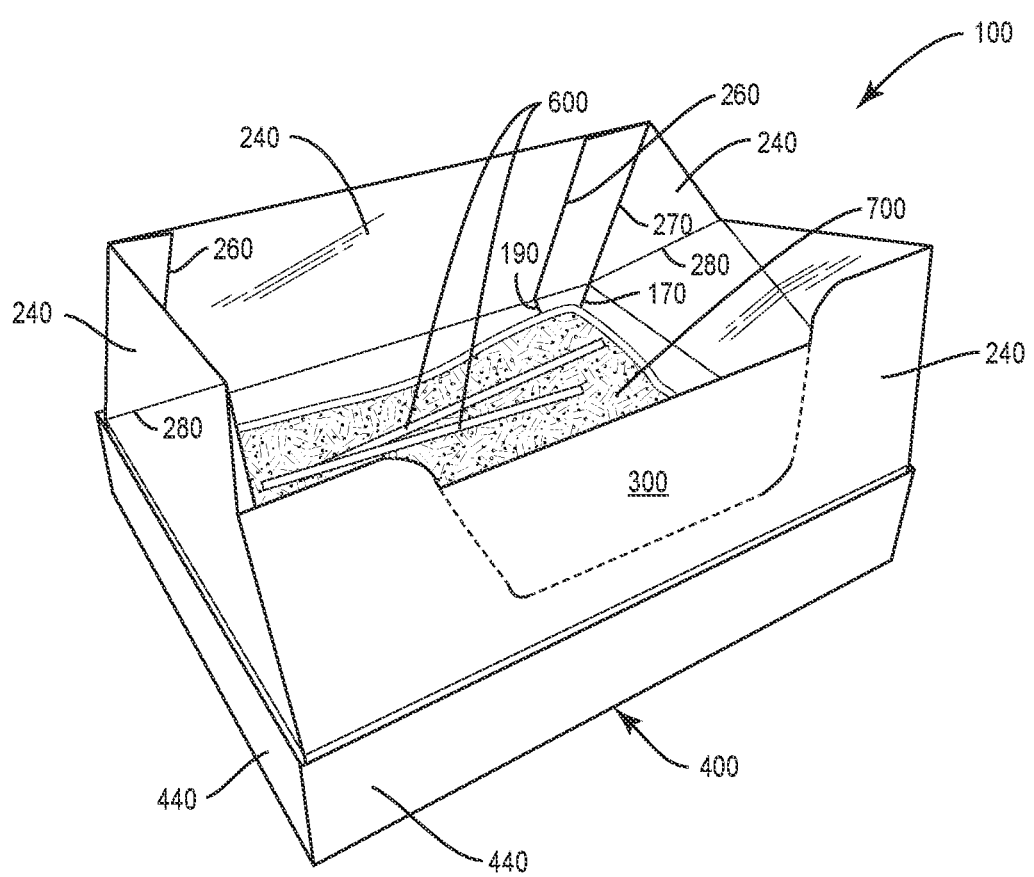
FIG. 13 is a perspective view of the cat litter box with the lid placed on the bottom and the extension panels partially unfolded.
Figure 14:
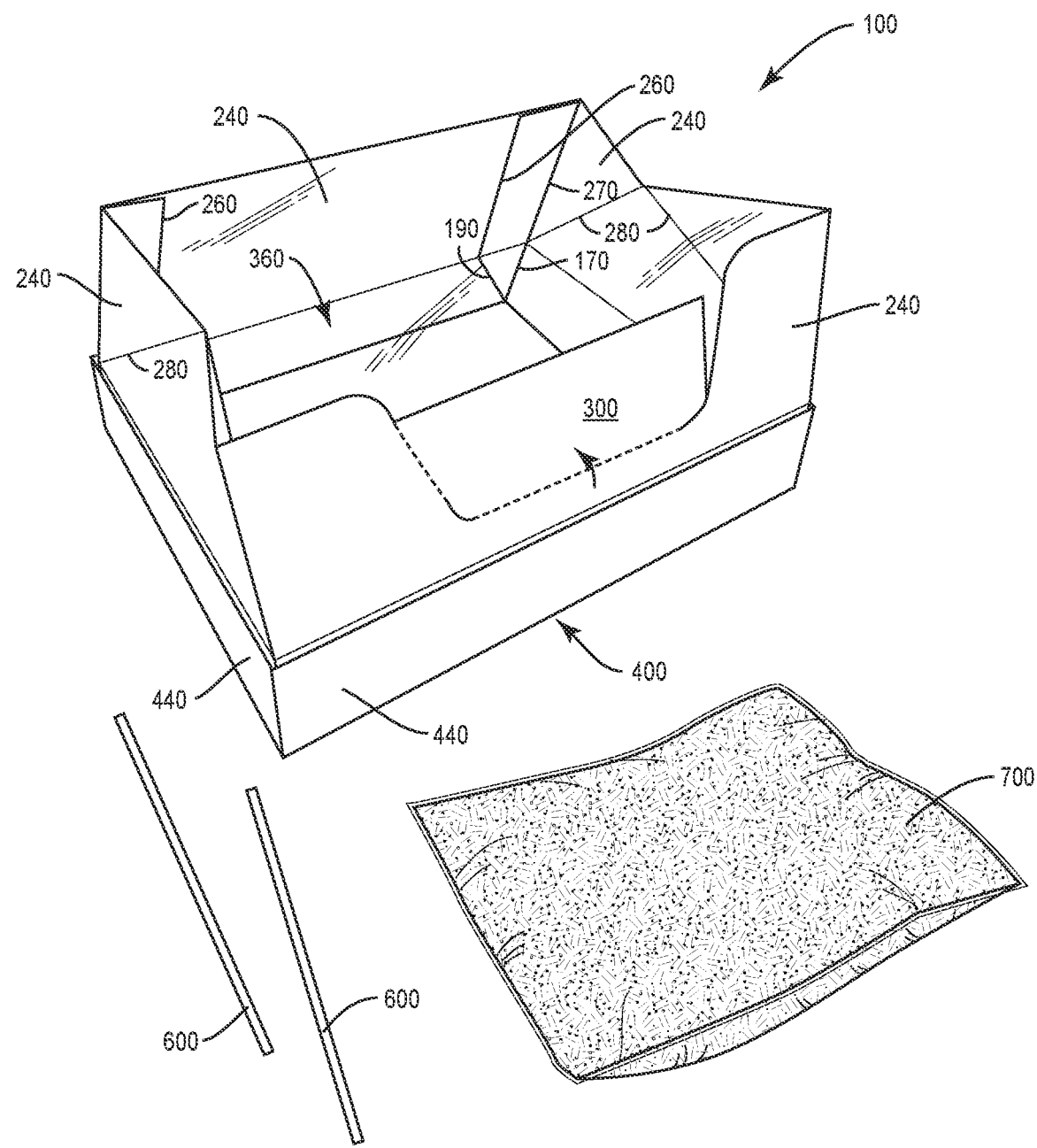
FIG. 14 is a perspective view of the cat litter box with the lid placed on the bottom and the contents removed.

To put the cat litter box 100 into use, the customer removes the lid 400 from the folded box 120, folds the extension panels 240 upward and outward to the unfolded position as shown in FIGS. 13 and 14, and places the reinforcing strips 600 provided on the top edges of the side panels 240A and 240C to lock the cat litter box 100 into the final operational position as shown in FIG. 15. The perforated cut-out 300 can either be removed and discarded or folded down inside the cat litter box 100 to provide an opening for the cat to enter into and exit from the cat litter box 100. The lid 400 may be stored by placing it under the cat litter box 100 as shown, or may be placed on top for use as a cover.

After approximately 30 days of use, the cat litter box 100 is ready to be properly disposed of. The reinforcing strips 600 are removed and placed inside the cat litter tray 500 or otherwise disposed of. The litter box is the folded back into the original folded position and the lid 400 is placed back on the top of the cat litter box 100 as shown in FIG. 11 for disposal.

What is claimed is:

1. A cat litter box comprising:
   a bottom comprising a single panel;
   side walls that extend upwardly from the bottom to form a litter compartment;
   extension panels hingedly connected to respective side walls and configured to move between a folded position and an unfolded position, the extension panels comprising:
     first and second long panels hingedly connected to respective first and second side walls on opposing sides of the litter compartment;
     first and second short panels hingedly connected to respective third and fourth side walls on opposing sides of the litter compartment;
     diagonal fold lines that extend along the first and second short panels to enable the first and second short panels to fold inwardly in the folded position and to extend over the single panel of the bottom;
     the first and second long panels positioned over the first and second short panels in the folded position to cover the diagonal fold lines;
     the first and second short panels joined with the first and second long panels to form a continuous enclosure; and
   an opening along one of the extension panels to enable a cat to enter into an interior space formed by the side walls and the extension panels when the extension panels are in the unfolded position;
   wherein the bottom, the side walls, and the extension panels are a single material blank with the bottom positioned at a center of the material blank and the side walls and the extension panels positioned along edges of the bottom.

2. The cat litter box of claim 1 further comprising a water-resistant layer positioned on inner surfaces of the bottom, the side walls, and the extension panels.

3. The cat litter box of claim 2 wherein the water-resistant layer is positioned solely on the inner surfaces of the bottom, the side walls, and the extension panels.

4. The cat litter box of claim 2 wherein the water-resistant layer is a low-density polyethylene coating.

5. The cat litter box of claim 1 wherein the extension panels are connected together in an overlapping arrangement.

6. The cat litter box of claim 1 wherein the bottom, the side walls, and the extension panels comprise a cardboard blank comprising an intermediate corrugated fluting, a pre-coated paperboard ply attached to a first side of the corrugated fluting, and an uncoated paperboard ply attached to an opposing second side of the corrugated fluting.

7. The cat litter box of claim 1 wherein the first and second long panels are flat and without the diagonal fold lines.

8. The cat litter box of claim 1 wherein the diagonal fold lines are symmetric about a longitudinal centerline of the litter compartment.

9. The cat litter box of claim 1 wherein the first and second long panels are exposed and extend over and cover the first and second short panels in the folded position.

10. The cat litter box of claim 1 wherein the opening is spaced away from the first and second short panels.

11. The cat litter box of claim 1 wherein the cat litter box comprises a rectangular shape and includes four of the side walls and four of the extension panels.

12. A cat litter box comprising:
    a bottom comprising a single panel;
    side walls that extend upwardly from the bottom to form a litter compartment;

extension panels hingedly connected to respective side walls and configured to move between a folded position and an unfolded position, the extension panels comprising:
- a first pair of panels hingedly connected to respective first and second side walls on opposing sides of the litter compartment;
- a second pair of panels hingedly connected to respective third and fourth side walls on opposing sides of the litter compartment;
- diagonal fold lines that extend along the first pair of panels to enable the first pair of panels to fold inwardly in the folded position and to extend over the single panel of the bottom;
- the second pair of panels positioned over the first pair of panels in the folded position to cover the diagonal fold lines;

an opening along one of the extension panels to enable a cat to enter into an interior space formed by the side walls and the extension panels when the extension panels are in the unfolded position; and wherein the bottom, the side walls, and the extension panels are a single material blank with the bottom positioned at a center of the material blank.

13. The cat litter box of claim 12 wherein the side walls and the extension panels are positioned along outer edges of the bottom of the material blank.

14. The cat litter box of claim 13, wherein the material blank is cardboard.

* * * * *